(12) United States Patent
Qiu et al.

(10) Patent No.: US 10,550,991 B2
(45) Date of Patent: Feb. 4, 2020

(54) CLAMPING APPARATUS AND UNMANNED AERIAL VEHICLE GIMBAL

(71) Applicant: AUTEL ROBOTICS CO., LTD., Shenzhen, Guangdong (CN)

(72) Inventors: Longxue Qiu, Guangdong (CN); Jiakun Wang, Guangdong (CN); Zengfei Wang, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 16/004,931

(22) Filed: Jun. 11, 2018

(65) Prior Publication Data

US 2018/0292042 A1    Oct. 11, 2018

Related U.S. Application Data

(63) Continuation of application No. PCT/CN2016/092729, filed on Aug. 1, 2016.

(30) Foreign Application Priority Data

Apr. 6, 2016    (CN) .................... 2016 2 0278463 U

(51) Int. Cl.
*F16M 11/04*    (2006.01)
*B64C 39/02*    (2006.01)
(Continued)

(52) U.S. Cl.
CPC ......... *F16M 11/041* (2013.01); *B64C 39/024* (2013.01); *F16M 13/02* (2013.01);
(Continued)

(58) Field of Classification Search
CPC combination set(s) only.
See application file for complete search history.

(56) References Cited

U.S. PATENT DOCUMENTS 6,220,589 B1 *    4/2001    Smith, III ............... B25B 5/003
                                                      269/133
7,571,522 B2 *    8/2009    Carnevali ................. A45F 5/00
                                                       24/3.1
(Continued)

FOREIGN PATENT DOCUMENTS

CN    203286232 U    11/2013
CN    103994310 A     8/2014
(Continued)

OTHER PUBLICATIONS

International Search Report dated Jan. 6, 2017; PCT/CN2016/092729.

(Continued)

*Primary Examiner* — Monica M Millner

(57) ABSTRACT

A clamping apparatus includes a carrier portion formed on a regularly shaped panel, where a track slot is formed in a length direction in the carrier portion; a movable unit, mounted at an end of the carrier portion and capable of being separated from the carrier portion along a length direction of the track slot; and a clamping unit, mounted on a movable unit and configured to prevent, in at least four directions, a clamped object from being separated from the carrier portion. The problem that a size range of clamped objects applicable to the clamping apparatus is limited. The clamping unit is configured to prevent, in the at least four directions, the clamped object from being separated from the carrier portion, effectively preventing the clamped object from being separated from the carrier portion and allowing the clamped object to be protected even in a complex environment.

9 Claims, 6 Drawing Sheets

(51) Int. Cl.
*F16M 13/02* (2006.01)
*B64D 47/08* (2006.01)
*F16M 11/06* (2006.01)

(52) U.S. Cl.
CPC ........ *B64C 2201/127* (2013.01); *B64D 47/08* (2013.01); *F16M 11/06* (2013.01); *F16M 2200/025* (2013.01)

(56) References Cited

U.S. PATENT DOCUMENTS

| | | | | |
|---|---|---|---|---|
| 8,027,464 | B2* | 9/2011 | Piekarz | ............... B60R 11/0241 |
| | | | | 379/446 |
| 8,627,953 | B1* | 1/2014 | Yeo | ..................... H04B 1/3888 |
| | | | | 206/320 |
| 8,752,802 | B1* | 6/2014 | Fan | ........................ H04M 1/04 |
| | | | | 248/309.1 |
| 9,280,038 | B1* | 3/2016 | Pan | ..................... G03B 17/561 |
| 9,420,712 | B2* | 8/2016 | Yang | ................... F16M 11/041 |

| | | | |
|---|---|---|---|
| 2007/0040089 | A1* | 2/2007 | Shiff ...................... A47B 97/04 |
| | | | 248/448 |
| 2008/0203260 | A1 | 8/2008 | Carnevali |
| 2014/0183238 | A1 | 7/2014 | Lin |
| 2015/0028170 | A1 | 1/2015 | Fan |

FOREIGN PATENT DOCUMENTS

| | | |
|---|---|---|
| CN | 204647755 U | 9/2015 |
| CN | 20494966 U | 1/2016 |
| CN | 104386249 B | 3/2016 |
| KR | 2014005297 U | 10/2014 |

OTHER PUBLICATIONS

Written Opinion of the International Searching Authority dated Jan. 6, 2017; PCT/CN2016/092729.
Extended European Search Report dated Dec. 10, 2018; Appln. No. 16897680.1.

* cited by examiner

CLAMPING APPARATUS AND UNMANNED AERIAL VEHICLE GIMBAL

CROSS-REFERENCE

This application is a continuation application of International Application No. PCT/CN2016/092729, filed on Aug. 1, 2016, which claims priority of Chinese Patent Application No. 201620278463.9, filed on Apr. 6, 2016, both of which are incorporated herein by reference in its entirety.

BACKGROUND

Technical Field

The present application relates to a fixing apparatus, and in particular, to a clamping apparatus and an unmanned aerial vehicle gimbal.

Related Art

With the development of intelligent terminals, more and more functions are being added to small intelligent terminals, for example, functions of listening to music, watching movies, shooting pictures, surfing on the Internet and playing games. In addition, the small intelligent terminals are developing to involve in daily life and portable small intelligent terminals have become an integral part of people's lives.

Usually, in the prior art, to help users use small intelligent terminals on particular occasions, for example, on a bike, with a selfie stick, or in other cases in which it is inconvenient to directly hold a small intelligent terminal in hand, a clamping apparatus capable of clamping a small intelligent terminal is provided. The small intelligent terminal is placed in the clamping apparatus and a clamping force is applied to the small intelligent terminal by means of a deforming force or buckles, to implement the clamping of the small intelligent terminal. However, the clamping apparatus in the prior art generally has a specific fixed size and is applicable to only a small intelligent terminal of a particular size. In addition, the clamping apparatus in the prior art generates only a pair of opposite clamping forces. When used in a complex environment (for example, in bumpy environments), the small intelligent terminal is easy to drop from the clamping apparatus and is damaged.

SUMMARY

A main technical problem to be resolved in the present application is to provide a clamping apparatus. A clamping unit is mounted on a movable apparatus capable of extending along a length direction of a carrier portion, resolving a problem in the prior art that a size range of clamped objects applicable to the clamping apparatus is limited. The clamping unit is configured to prevent, in at least four directions, a clamped object from being separated from the carrier portion, effectively preventing the clamped object from being separated from the carrier portion.

To resolve the foregoing technical problem, a technical solution adopted in the present application is to provide a clamping apparatus, which includes:

a carrier portion, which is formed on a panel, where a track slot is formed in a length direction in the carrier portion;

a movable unit, mounted at an end of the carrier portion and capable of being separated from the carrier portion along a length direction of the track slot; and a clamping unit, mounted on a movable unit and configured to prevent, in at least four directions, a clamped object from being separated from the carrier portion.

Further, the movable unit includes:

a first sliding component and a second sliding component, both disposed in the carrier portion, where the first sliding component extends out of an end of the carrier portion along the length direction of the track slot and the second sliding component extends out of the other end of the carrier portion along the length direction of the track slot;

a first elastic component and a second elastic component, where the first elastic component is sleeved over or connected to the first sliding component, the second elastic component is sleeved over or connected to the second sliding component and the first elastic component and the second elastic component each keep applying an elastic force to the first sliding component and the second sliding component; and a first connecting member and a second connecting member, where the first connecting member is disposed at an end of the first sliding component, the second connecting member is disposed at an end of the second sliding component and the first connecting member and the second connecting member are respectively configured to prevent the first sliding component and the second sliding component from excessively deeply extending into the carrier portion.

Further, the clamping unit includes:

a swing component, which is mounted on the first connecting member and is configured to prevent, in at least three directions, the clamped object from being separated from the carrier portion; and a clamping member, which is mounted to the second connecting member and is configured to prevent, in at least one direction, the clamped object from being separated from the carrier portion.

Further, the swing component includes:

a first swing rod and a second swing rod, each having an end connected to the first connecting member, where the first swing rod and the second swing rod are mounted to the first connecting member in such a manner that the first swing rod and the second swing rod arc away from the carrier portion.

Further, a first stopping member and a second stopping member are respectively mounted at two ends of the first swing rod and the first stopping member and the second stopping member are arranged at opposite positions of the first swing rod, so that when an interaction force is generated between the first stopping member and the clamped object, the second stopping member moves with the first swing rod until the second stopping member comes into contact with the clamped object.

Further, a third stopping member and a fourth stopping member are respectively mounted at two ends of the second swing rod and the third stopping member and the fourth stopping member are arranged at opposite positions of the second swing rod, so that when an interaction force is generated between the third stopping member and the clamped object, the fourth stopping member moves with the second swing rod until the fourth stopping member comes into contact with the clamped object.

Further, the clamping member is dented inward to form a recess and the recess is configured in such a manner that the clamped object is allowed to partially protrude into the recess.

Further, a connector is disposed at an end of the clamping member and the connector is flush with the end of the clamping member.

Further, a first limiting member and a second limiting member are mounted on the first connecting member and the first limiting member and the second limiting member are configured to prevent the first swing rod and the second swing rod from being excessively far away from the carrier portion.

Further, a portion of the first swing rod close to the first limiting member is configured in such a manner that the first swing rod is not in contact with or not limited by the first limiting member when the first swing rod is away from the carrier portion by a specific range; and a portion of the second swing rod close to the second limiting member is configured in such a manner that the second swing rod is not in contact with or not limited by the second limiting member when the second swing rod is away from the carrier portion by a specific range.

In a specific application of a clamping apparatus of the present invention, the present invention further relates to an unmanned aerial vehicle gimbal, where the clamping apparatus according to any of the foregoing descriptions is connected to the unmanned aerial vehicle gimbal.

The present application has the following beneficial effects: In the present application, the clamping unit is mounted on a movable apparatus capable of extending along the length direction of the carrier portion, resolving a problem in the prior art that a size range of clamped objects applicable to the clamping apparatus is limited. The clamping unit is configured to prevent, in the at least four directions, the clamped object from being separated from the carrier portion, effectively preventing the clamped object from being separated from the carrier portion and allowing the clamped object to be protected even in a complex environment.

Figure 1:
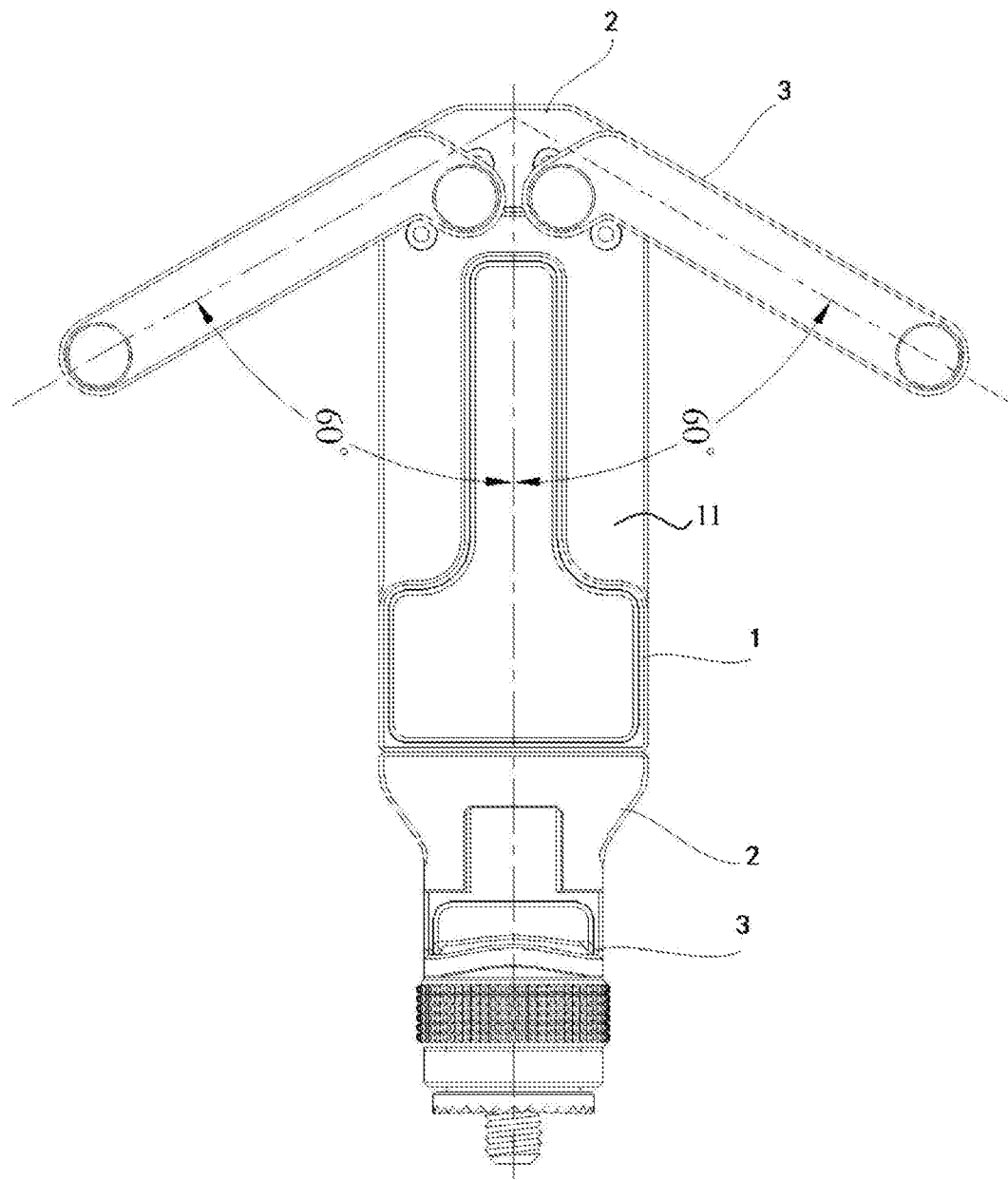
FIG. 1 is a schematic structural diagram of a clamping apparatus according to the present application.

Reference numerals of the accompanying drawings: 1: Carrier portion; 11: Accommodation slot; 2: Movable unit; 21: First connecting member; 22: Second connecting member; 221: Clamping slot; 23: First sliding component; 24: Second sliding component; 25: First elastic component; 26: Second elastic component; 27: First limiting member; 28: Second limiting member; 3: Clamping unit; 31: Swinging component; 311: First swing rod; 312: Second swing rod; 313: First stopping member; 314: Second stopping member; 315: Third stopping member; 316: Fourth stopping member; 317: T-shaped nut; 318: Rubber sleeve; 32: Clamping member; 321: Recess; 322: Circular column; 323: L-shaped panel; 33: Connector; 331: Screw; 332: Foam cushion; 333: Nut; 334: Gasket; 335: Plastic gasket; 336: Flange shaft

DETAILED DESCRIPTION

For ease of understanding the present application, the present application is described in further detail below with reference to the accompanying drawings and specific implementations. It should be noted that when an element is described as being "fixed" on another element, the element may be directly on the another element, or one or more intermediate elements may exist therebetween. When an element is described as being "connected" to another element, the element may be directly connected to the another element, or one or more intermediate elements may exist therebetween. Terms such as "vertical", "horizontal", "left", and "right" and similar expressions used in this specification are merely used for the purpose of description.

Unless otherwise defined, meanings of all technical and scientific terms used in this specification are the same as that usually understood by persons skilled in the technical field to which the present application belongs. The terms used in this specification of the present application are merely intended to describe specific implementations rather than limit the present application. A term "and/or" used in this specification includes any or all combinations of one or more related listed items.

In the following, the present application is described in detail with reference to the accompanying drawings and implementations.

Embodiment 1

As shown in FIG. 1, a clamping apparatus is provided, which includes: a carrier portion 1, a movable unit 2 and a clamping unit 3. The carrier portion 1 is formed on a panel and a track slot is formed in a length direction in the carrier portion 1. The movable unit 2 is mounted at an end of the carrier portion 1 and the movable unit 2 is capable of separating from the carrier portion 1 along a length direction of the track slot. The clamping unit 3 is mounted on the movable unit 2 and the clamping unit 3 is configured to prevent, in at least four directions, a clamped object from being separated from the carrier portion 1.

In this implementation, the carrier portion 1 is specifically a cuboid that is hollow. Three track slots are formed through isolation in the length direction in the cuboid and each track slot is provided with an opening. An opening of a track slot in the middle is located on a side wall of the cuboid in the length direction and openings of track slots on two sides are located on another side wall of the cuboid in the length direction. A T-shaped protrusion is formed on an upper surface of the cuboid and two sides of the T-shaped protrusion are dent downward relative to the T-shaped protrusion to form accommodation slots 11. The specific shape of the carrier portion 1 is not limited to cuboid and specifically. The carrier portion 1 may be a square column or elliptical according to different application scenarios.

The movable unit 2 includes: a first sliding component 23, a second sliding component 24, a first elastic component 25, second elastic components 26, a first connecting member 21 and a second connecting member 22.

Figure 2:
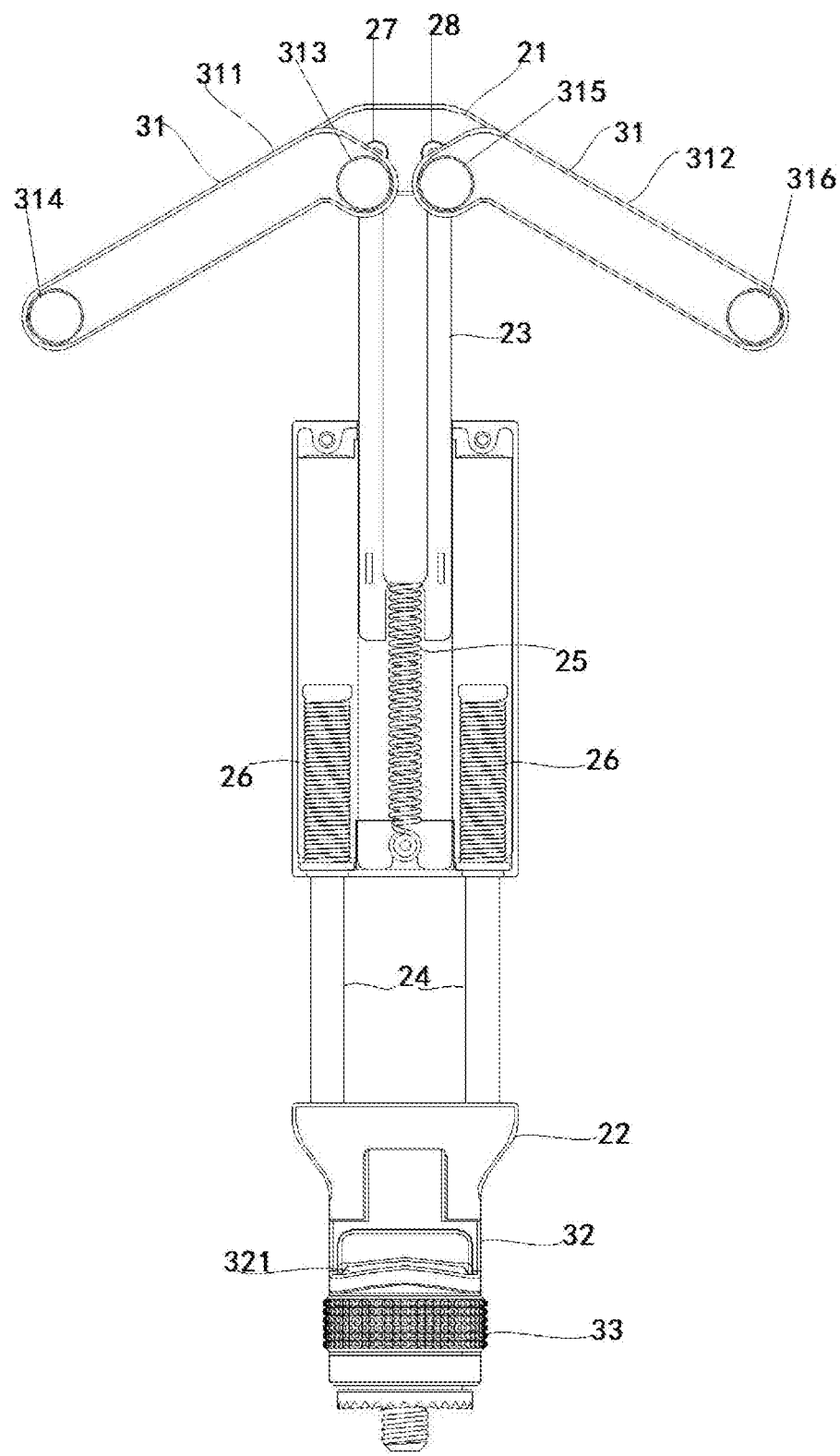
FIG. 2 is a schematic exploded diagram of a clamping apparatus according to the present application.

As shown in FIG. 2, specifically, the first sliding component 23 is specifically a sliding bar that has a cutout in the middle. The sliding bar is inserted into the track slot from the opening of the track slot in the middle of the carrier portion 1. An end of the sliding bar located in the track slot is provided with a U-shaped notch in the middle. The first sliding component 23 and the first elastic component 25 are cooperatively used and the first elastic component 25 is specifically a spiral spring. An end of the spiral spring is connected to the U-shaped notch of the sliding bar and the other end is connected to a side wall at the other end of the track slot in the middle. A hook is disposed on the side wall at the other end of the track slot and is configured to connect to the spiral spring. After extending out of the opening of the track slot in the middle. The other end of the sliding bar is connected to the first connecting member 21. The first connecting member 21 is specifically a trapezoidal panel. Two legs of the trapezoidal panel are arc-shaped. The size of a relatively longer edge of the trapezoidal panel is completely consistent with that of a side edge of the carrier portion 1 provided with a track slot. The relatively longer edge of the trapezoidal panel is connected to the end of the sliding bar extending out of the track slot. Because the sectional area of an end of the trapezoidal panel connected to the sliding bar is greater than that of the opening of the track slot, the trapezoidal panel is capable of preventing the sliding bar from excessively deeply extending into the track slot, so that the spiral spring keeps applying a tensile deformation force to the sliding bar.

In an optional embodiment of the first sliding component 23, the first sliding component 23 is specifically a column. The column is inserted into the track slot from the opening of the track slot in the middle of the carrier portion 1. An end of the column located in the track slot protrudes to form a stopping edge. The sectional area of the stopping edge is greater than the sectional area of the column and is also greater than the sectional area of the opening of the track slot. The first sliding component 23 and the first elastic component 25 are cooperatively used. The first elastic component 25 is specifically a spiral spring. The spiral spring is sleeved over the column. The sectional area of the spiral spring is less than the sectional area of the stopping edge but is greater than the sectional area of the opening of the track slot. After extending out of the opening of the track slot in the middle, the other end of the column is connected to the first connecting member 21. The first connecting member 21 is specifically a trapezoidal panel. Two legs of the trapezoidal panel are arc-shaped. The size of a relatively longer edge of the trapezoidal panel is completely consistent with that of a side edge of the carrier portion 1 provided with a track slot. The relatively longer edge of the trapezoidal panel is connected to the end of the column extending out of the track slot. Because the sectional area of an end of the trapezoidal panel connected to the column is greater than that of the opening of the track slot, the trapezoidal panel is capable of preventing the column from excessively deeply extending into the track slot, so that the spiral spring keeps applying an elastic deformation force to the column.

Specifically, the second sliding component 24 is specifically a first column and a second column. The first column is completely consistent with the second column. Take the first column as an example for description. The first column is inserted into a track slot from an opening of the track slot on the left of the carrier portion 1. An end of the first column located in the track slot also protrudes to form a stopping edge. The sectional area of the stopping edge is greater than the sectional area of the column and is also greater than the sectional area of the opening of the track slot. Likewise, the second column is located in a track slot on the right. The second sliding component 24 and the second elastic components 26 are cooperatively used and the second elastic components are specifically two spiral springs. The two spiral springs are respectively sleeved over the first column and the second column. The sectional area of the spiral spring is less than the sectional area of the stopping edge but is greater than the sectional area of the opening of the track slot. After extending out of the opening of the track slot in the middle, the other end of each of the first column and the second column is connected to the second connecting member 22. The second connecting member 22 is specifically a trapezoid-type panel. An end of the trapezoid-type panel that is not connected to the first column and the second column is dent inward to form a clamping slot 221. Two legs of the trapezoid-type panel are arc-shaped. The size of a relatively longer edge of the trapezoid-type panel is completely consistent with the size of the side edge of the carrier portion 1. The relatively longer edge of the trapezoid-type panel is connected to the end of each of the first column and the second column extending out of the track slot. Because the sectional area of an end of the trapezoid-type panel connected to the first column and the second column is greater than that of the opening of the track slot, the trapezoid-type panel is capable of preventing the first column and the second column from excessively deeply extending into the track slot, so that the spiral springs each keep applying an elastic deformation force to the first column and the second column.

The clamping unit 3 includes a swing component 31 and a clamping member 32. The swing component 31 is mounted on the first connecting member 21 and is configured to prevent, in at least three directions, the clamped object from being separated from the carrier portion 1. The clamping member 32 is mounted to the second connecting member 22 and is configured to prevent, in at least one direction, the clamped object from being separated from the carrier portion 1. A connector 33 is disposed at an end of the clamping member 32 and the connector 33 is flush with the end of the clamping member 32.

Figure 3:
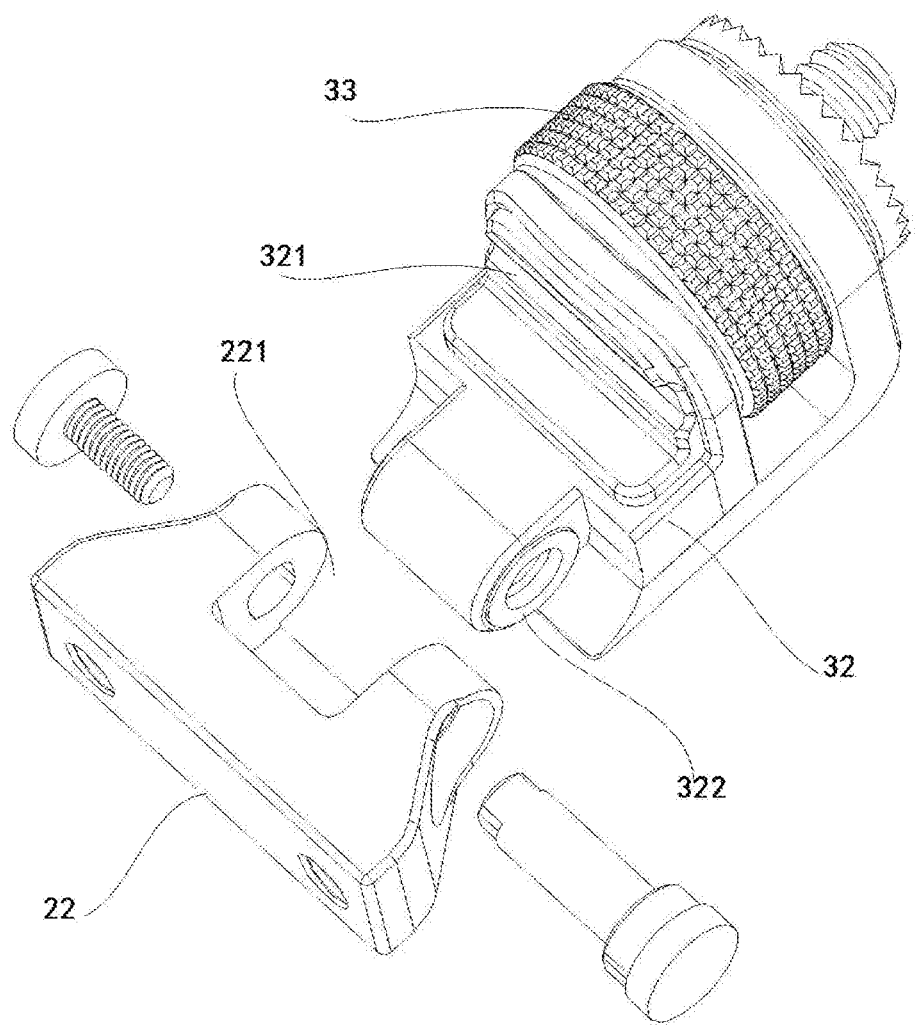
FIG. 3 is a schematic diagram of assembling a connector and a second connecting member according to the present application.
Figure 4:
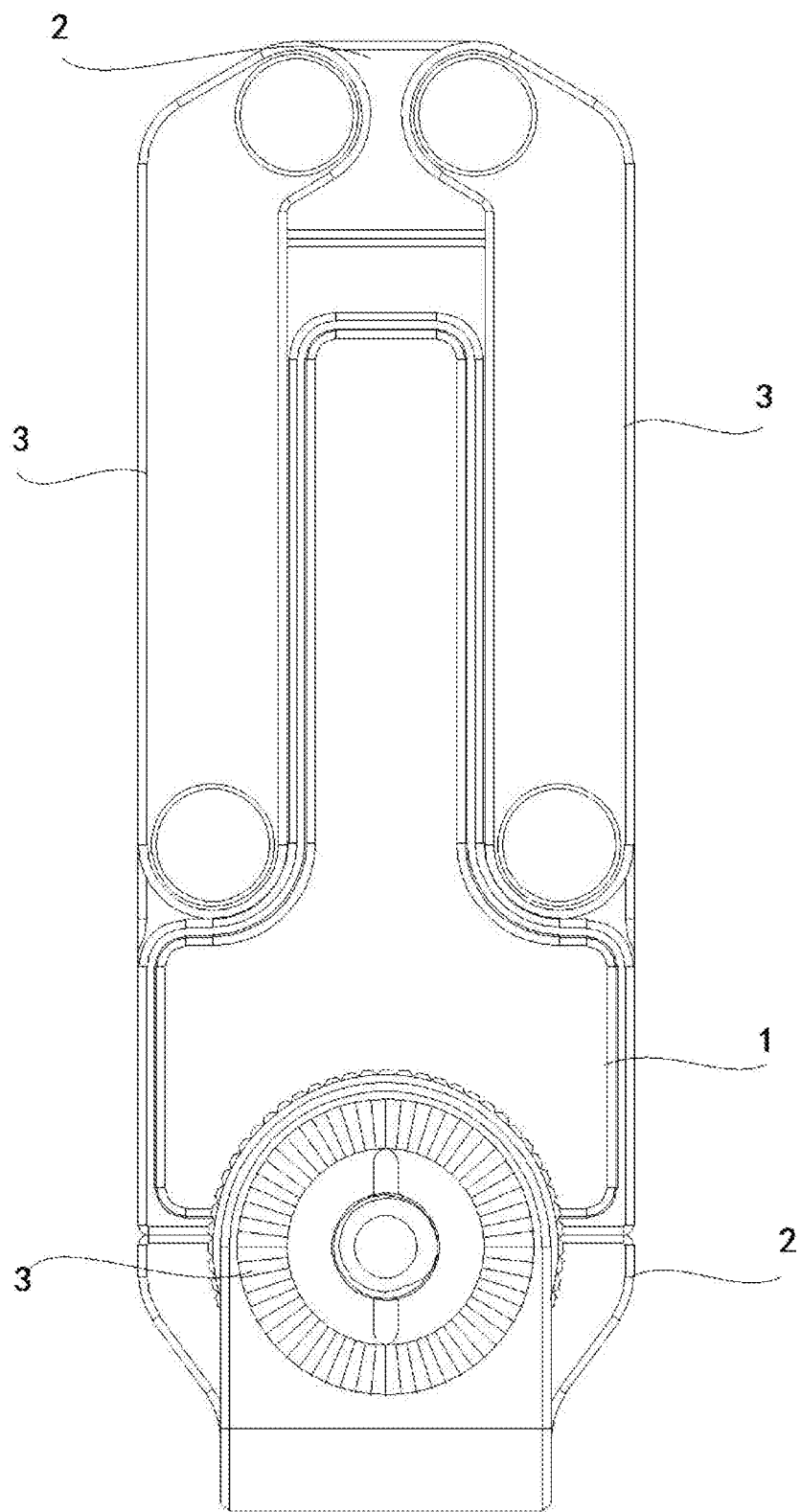
FIG. 4 is a schematic overall diagram of a clamping apparatus according to the present application wherein the clamping member of the clamping apparatus is at an angle of 90°.
Figure 5:
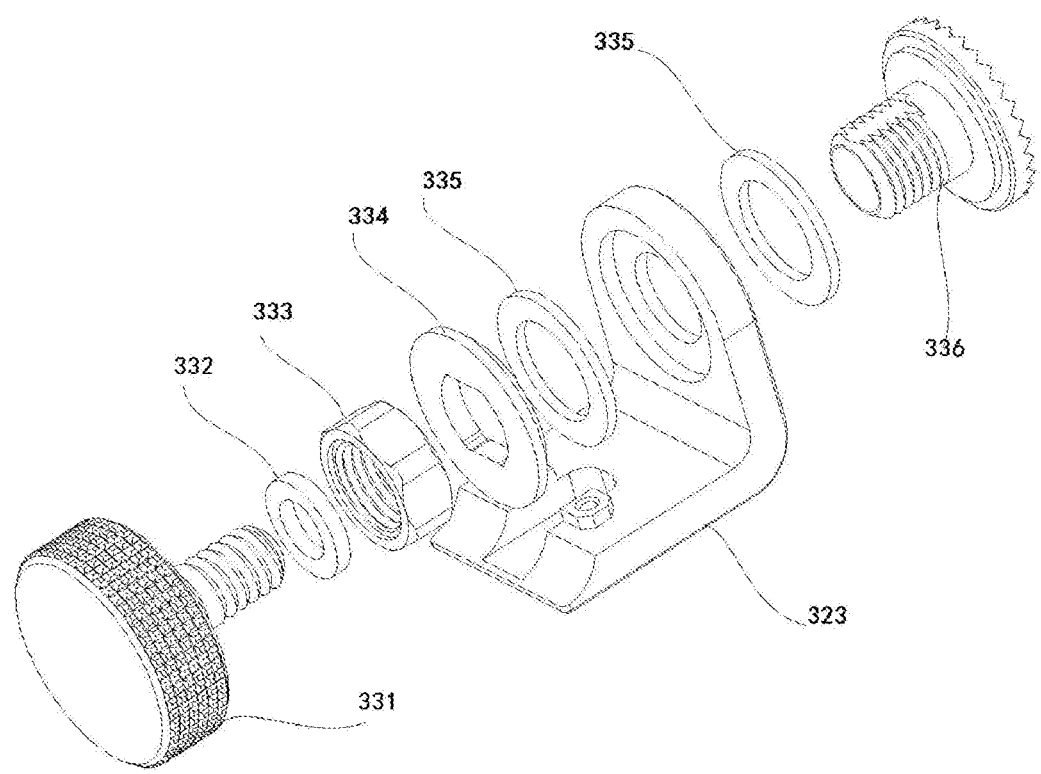
FIG. 5 is a schematic exploded diagram of a connector according to the present application.

Specifically, the swing component 31 includes a first swing rod 311 and a second swing rod 312. An end of the first swing rod 311 is mounted on an upper surface of the first connecting member 21 and the first swing rod 311 and the first connecting member 21 are connected together by using a shaft. The first swing rod 311 is capable of rotating around a shaft connecting portion, so that the first swing rod 311 is capable of arcing away from the carrier portion 1. Likewise, the second swing rod 312 and the first swing rod 311 are symmetrically connected to the upper surface of the first connecting member 21 and the second swing rod 312 is also capable of arcing away from the carrier portion 1. As shown in FIG. 3, the clamping member 32 is mounted on an L-shaped panel 323. The clamping member 32 is mounted on an inner surface of the L-shaped panel 323 and an end of the L-shaped panel 323 is connected to a cylindrical column 322 provided with an axle hole in the middle. The cylindrical column 322 cooperates with the clamping slot 221 of the second connecting member 22 and the cylindrical column 322 protrudes into the clamping slot 221. Two side walls of the clamping slot 221 are provided with through holes cooperating with the axle hole. The through holes and the axle hole are located on a same straight line and implement an axle connection by using an inserted rotating shaft. The L-shaped panel 323 drives the clamping member 32 to be capable of rotating by 90° relative to the second connecting member 22. As shown in FIG. 4, when the other end of the L-shaped panel 323 rotates above the carrier portion 1, the clamping member 32 is buckled, to apply a downward clamping force to the clamped object. A side of the clamping member 32 towards the clamped object is dent inward to form a recess 321 and the shape of the recess 321 is similar to the shape of the clamped object, which prevents the clamped object from being separated from the carrier portion 1 in a vertical direction. When the L-shaped panel 323 and the carrier portion 1 are located in a same horizontal plane, a horizontal clamping force is applied to the clamped object. As shown in FIG. 5, the L-shaped panel 323 is further connected to a connector 33 and the connector 33 is connected to the same end of the clamping member 32 in the L-shaped panel 323. The connector 33 includes a screw 331, a foam cushion 332, a nut 333, a gasket 334, a plastic gasket 335 and a flange shaft 336. An end of the L-shaped panel 323 parallel with the gasket 334 is provided with a through hole for insertion by the flange shaft 336. The screw 331, the foam cushion 332, the nut 333, the gasket 334 and the plastic gasket 335 are located in a gap between the L-shaped panel 323 and the clamping member 32. The flange shaft 336 is located on the other side opposite to the end of the L-shaped panel 323 parallel with the gasket 334. The flange shaft 336 is provided with a thread on both an inner surface and an outer surface. When the flange shaft 336 passes through the through hole, an external thread is connected to the nut 333 and an internal thread is connected to the screw 331.

Figure 6:
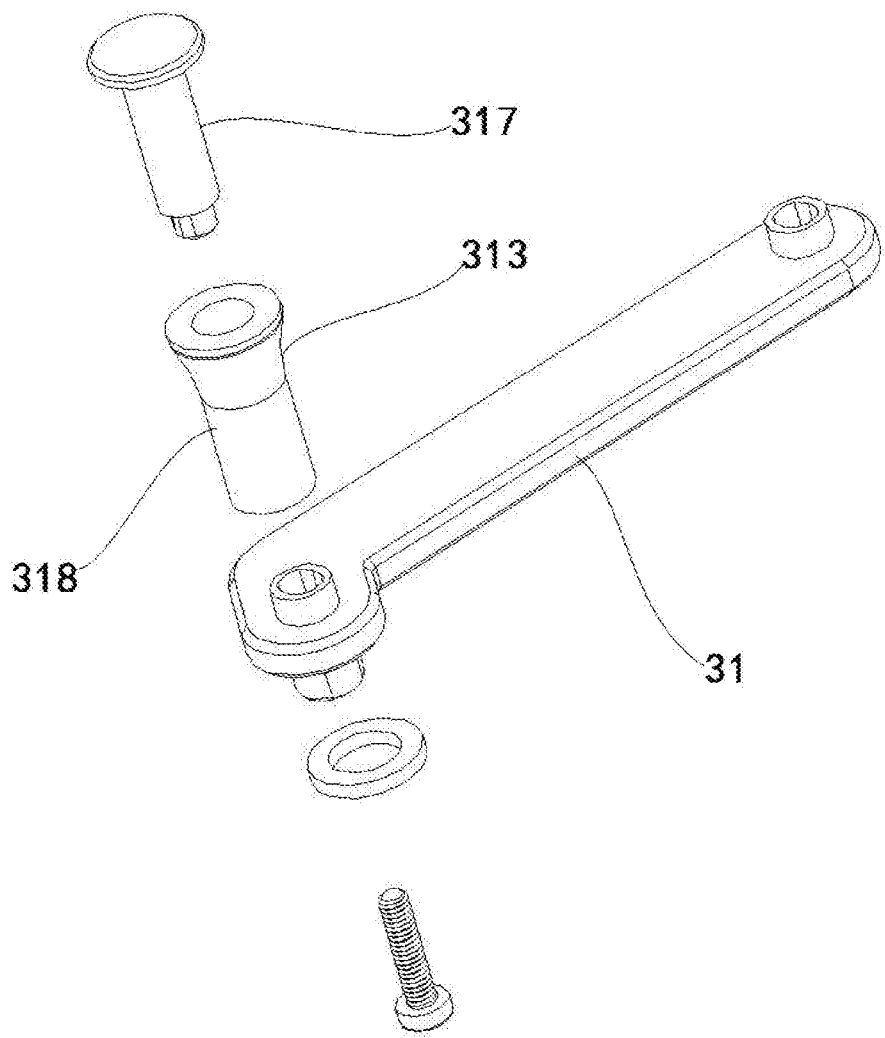
FIG. 6 is a schematic diagram of assembling a first swing rod and a first stopping member according to the present application.

More specifically, stopping members are mounted on the first swing rod 311 and the second swing rod 312. Two ends of the first swing rod 311 are respectively connected to a first stopping member 313 and a second stopping member 314. As shown in FIG. 6, the first stopping member 313 includes a T-shaped nut 317, a rubber sleeve 318 and a screw (not marked). Take the first stopping member 313 as an example. The first stopping member 313 is mounted to at an end of the first swing rod 311 located on the first connecting member 21. The first swing rod 311 is provided with a through hole for the screw to pass through. The screw is connected to the T-shaped nut 317 after passing through the through hole of the first swing rod 311. The rubber sleeve 318 is sleeved over the T-shaped nut 317 and a specific distance is formed between the first swing rod 311 and a nut head of the T-shaped nut 317. When the clamped object is placed on the carrier portion 1, a portion of the clamped object can protrude into a position between the first swing rod 311 and the T-shaped nut 317 and the T-shaped nut 317 is capable of blocking the clamped object in a horizontal direction and the vertical direction. The second stopping member 314 and the first stopping member 313 have consistent structures. The difference lies in that the second stopping member 314 is connected to the other end of the first swing rod. The first stopping member 313 and the second stopping member 314 are distributed on two sides of a rotating shaft of the first swing rod 311. The rotating shaft (not shown in the figure) connected to the first connecting member 21 is disposed at a lower portion of the first swing rod 311. Because the first stopping member 313 and the second stopping member 314 are distributed on the two sides of the rotating shaft of the first swing rod 311, when an interaction force is generated between the first stopping member 313 and the clamped object, the first swing rod 311 tends to move to eliminate the force, that is, rotates by using the rotating shaft is as a center, to cause the first stopping member 313 to move towards the force. In this process, an end of the first swing rod 311 at which the second stopping member is mounted moves towards the clamped object, so that the second stopping member 314 comes into contact with the clamped object and applies an extrusion force to the clamped object, which is convenient for use. The first stopping member 313 and the second stopping member 314 are arranged in such a structure that an end of the first swing rod 311 is capable of automatically applying a clamping force to the clamped object when a force is applied to the other end, which is convenient for use. Structures of a third stopping member 315 and a fourth stopping member 316 are consistent with the structure of the first stopping member 313 and the working principles are also the same. In an optional implementation of the stopping member, the first stopping member 313, the second stopping member 314, the third stopping member 315 and the fourth stopping member 316 may be designed as (not limited to) r-shaped panels.

More specifically, a first limiting member 27 and a second limiting member 28 are disposed on the upper surface of the first connecting member 21. The first limiting member 27 and the second limiting member 28 are configured to prevent the first swing rod 311 and the second swing rod 312 from being excessively far away from the carrier portion 1. The first limiting member 27 and the second limiting member 28 have consistent structures. In this implementation, the first limiting member 27 and the second limiting member 28 are screws mounted on the first connecting member 21. The first limiting member 27 is flush with the second limiting member 28. The first limiting member 27 and the second limiting member 28 are placed at positions close to the first swing rod 311 and the second swing rod 312. To avoid the first limiting member 27 and the second limiting member 28 from excessively greatly limiting the first swing rod 311 and the second swing rod 312, portions of the first swing rod 311 and the second swing rod 312 close to the first limiting member 27 and the second limiting member 28 are designed as arc-shaped edges. In some implementations, the first limiting member 27 and the second limiting member 28 are placed at positions relatively far away from the first swing rod 311 and the second swing rod 312, to avoid the first limiting member 27 and the second limiting member 28 from excessively greatly limiting the first swing rod 311 and the second swing rod 312. The first swing rod 311 and the second swing rod 312 are put away in the accommodation slots 11 of the carrier portion 1 when there is no clamped object. The first swing rod 311 and the second swing rod 312 in use can be opened to form a maximum angel of 120°, but not limited thereto. Specifically, the first swing rod 311 and the second swing rod 312 may be opened at a larger angle according to different application scenarios by adjusting a distance between the first limiting member 27 and the second limiting member 28.

The clamped object in this implementation includes (not limited to): smart phones or intelligent tablet computers of various types.

Embodiment 2

An unmanned aerial vehicle gimbal is provided, including a gimbal support and a clamping apparatus connected to gimbal support. The gimbal support is a three-axis gimbal support including three axes, which are respectively a yaw axis for controlling the gimbal to rotate along a Y-axis, a roll axis for controlling the gimbal to rotate along a Z-axis, a pitch axis for controlling the gimbal to rotate along an X-axis. The three axes separately implementing three-dimensional rotation of a camera by using moving connections to the support. The clamping apparatus is connected to the pitch axis.

Because the support of an unmanned aerial vehicle is connected to a clamping apparatus, devices capable of connecting to the clamping apparatus include: intelligent devices such as smart phones or intelligent tablet computers. That is, the unmanned aerial vehicle is capable of shooting pictures with a smart phone. In this way, aerial data of the unmanned aerial vehicle can be rapidly transmitted by using a wireless network.

In some implementations, a fly control system of the unmanned aerial vehicle is connected to a clamped object on the clamping apparatus, by using an audio line. In such a manner, super remote control of the unmanned aerial vehicle can be implemented by means of wireless communication between intelligent terminals.

It should be noted that, the preferred implementations of the present application are provided in this specification with reference to the accompanying drawings of the present application. However, the present application can be implemented in other various forms and is not limited to the implementations described in this specification. These implementations impose no extra limitation on the content of the present application and these implementations are provided to make a thorough understanding of the disclosure of the present application. In addition, the foregoing various technical features may be further combined to form implementations not enumerated above and the implementations shall all fall within the scope of this specification of the present application. Further, a person of ordinary skill in the art may make improvements or variations according to the foregoing descriptions and these improvements and variations all fall within the protection scope of present application.

What is claimed is:

1. A clamping apparatus, which comprises:
   a carrier portion, which is formed on a panel, wherein a track slot is formed in a length direction in the carrier portion;
   a movable unit, mounted at an end of the carrier portion and capable of being separated from the carrier portion along a length direction of the track slot; and
   a clamping unit, mounted on a movable unit and configured to prevent a clamped object from being separated from the carrier portion;
   wherein the movable unit comprises:
   a first sliding component and a second sliding component disposed in the carrier portion, wherein the first sliding component extends out of an end of the carrier portion along the length direction of the track slot and the second sliding component extends out of the other end of the carrier portion along the length direction of the track slot;
   a first connecting member and a second connecting member, wherein the first connecting member is disposed at an end of the first sliding component, the second connecting member is disposed at an end of the second sliding component;
   wherein the clamping unit comprises a swing component mounted on the first connecting member and a clamping member mounted to the second connecting member;
   wherein the swing component comprises two swing rods, each of the two swing rods has one end connected to the first connecting member by using a rotating shaft, each of the two swing rods comprises two stopping members disposed at two ends of the swing rod, when the clamped object being placed on the carrier portion, a portion of the clamped object protruding into a position between the swing rod and the stopping member so that preventing the clamped object from being separated from the carrier portion in a horizontal direction and a vertical direction;
   wherein one end of the clamping member is rotably connected to the second connecting member by using a L-shaped panel in such a manner that when the clamping member is rotated to a first position, the clamping member prevents the clamped object from being separated from the carrier portion in the vertical direction, and when the clamping member is rotated to a second position, the clamping member prevents the clamped object from being separated from the carrier portion in the horizontal direction.

2. The clamping apparatus according to claim 1, wherein the movable unit comprises:
   a first elastic component and a second elastic component, wherein the first elastic component is sleeved over or connected to the first sliding component, the second elastic component is sleeved over the second sliding component and the first elastic component and the second elastic component each keep applying an elastic force to the first sliding component and the second sliding component.

3. The clamping apparatus according to claim 1, wherein the two swing rods comprises a first swing rod and a second swing rod, a first stopping member and a second stopping member being respectively mounted at two ends of the first swing rod and the first stopping member and the second stopping member being arranged at opposite positions of the first swing rod, so that when an interaction force is generated between the first stopping member and the clamped object, the second stopping member moves with the first swing rod until the second stopping member comes into contact with the clamped object.

4. The clamping apparatus according to claim 3, wherein a third stopping member and a fourth stopping member are respectively mounted at two ends of the second swing rod and the third stopping member and the fourth stopping member are arranged at opposite positions of the second swing rod, so that when an interaction force is generated between the third stopping member and the clamped object, the fourth stopping member moves with the second swing rod until the fourth stopping member comes into contact with the clamped object.

5. The clamping apparatus according to claim 1, wherein the clamping member is dented inward to form a recess and the recess is configured in such a manner that the clamped object is allowed to partially protrude into the recess.

6. The clamping apparatus according to claim 1, wherein a connector is disposed at an end of the clamping member and the connector is flush with the end of the clamping member.

7. The clamping apparatus according to claim 1, wherein a first limiting member and a second limiting member are mounted on the first connecting member and the first limiting member and the second limiting member are configured to prevent the first swing rod and the second swing rod from being excessively far away from the carrier portion.

8. The clamping apparatus according to claim 7, wherein a portion of the first swing rod close to the first limiting member is configured in such a manner that the first swing rod is not in contact with or not limited by the first limiting member when the first swing rod is away from the carrier portion by a specific range; and
   a potion of the second swing rod close to the second limiting member is configured in such a manner that the second swing rod is not in contact with or not limited by the second limiting member when the second swing rod is away from the carrier portion by a specific range.

9. The clamping apparatus according to claim 1, wherein the stopping members are T-shaped nuts.

* * * * *